J. F. O'CONNOR.
SPRING SHOCK ABSORBER.
APPLICATION FILED JUNE 9, 1917.
1,290,315.
Patented Jan. 7, 1919.
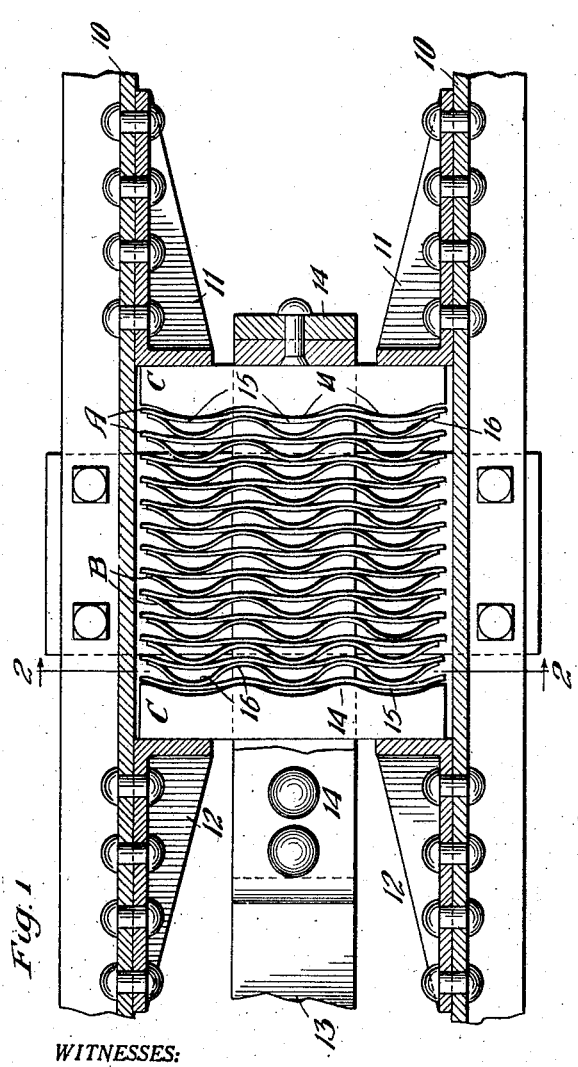
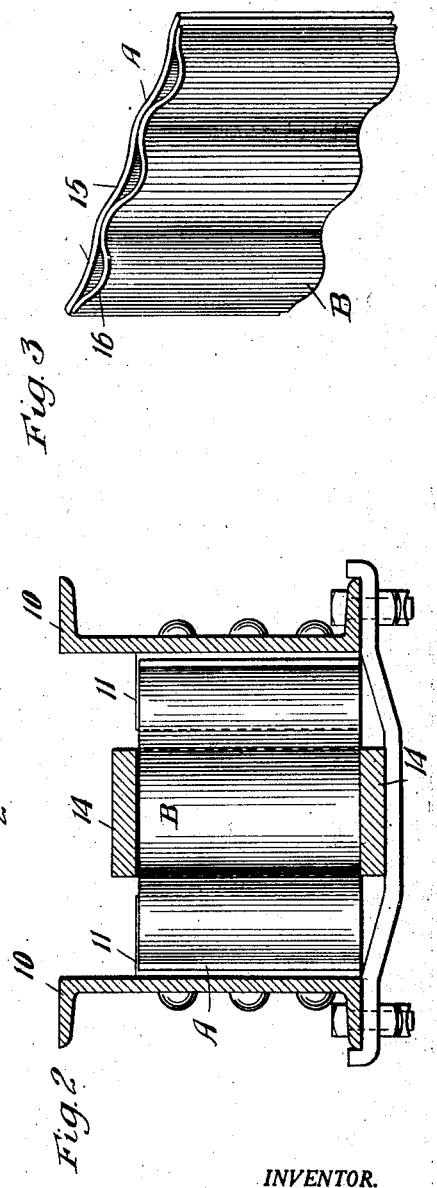
WITNESSES:
Wm. Geiger
INVENTOR.
John F. O'Connor
BY George I. Haight
ATTORNEY ns
UNITED STATES PATENT OFFICE.

JOHN F. O'CONNOR, OF CHICAGO, ILLINOIS, ASSIGNOR TO WILLIAM H. MINER, OF CHAZY, NEW YORK.

SPRING SHOCK-ABSORBER.

1,290,315.  Specification of Letters Patent.  Patented Jan. 7, 1919.

Application filed June 9, 1917. Serial No. 173,857.

*To all whom it may concern:*

Be it known that I, JOHN F. O'CONNOR, a citizen of the United States, residing at Chicago, in the county of Cook and State of Illinois, have invented a certain new and useful Improvement in Spring Shock-Absorbers, of which the following is a full, clear, concise, and exact description, reference being had to the accompanying drawings, forming a part of this specification.

This invention relates to improvements in spring shock absorbers.

One object of the invention is to provide a spring plate shock absorber, more particularly adapted for draft gears, having a greater capacity for the space occupied than spring shock absorbers heretofore used.

Another and more specific object of the invention is to provide a corrugated spring plate shock absorber so formed and arranged that the spring plates prevent a decrease of capacity as the ultimate load is applied.

In the drawing forming a part of this specification, Figure 1 is a horizontal sectional view of a portion of a railway draft rigging showing my improvements as applied thereto. Fig. 2 is a transverse vertical sectional view, taken substantially on line 2—2 of Fig. 1. And Fig. 3 is a perspective view of two of the spring plates employed with my improvements.

In said drawing, 10—10 denote channel center sills of a railway car to which are secured rear stops 11 and front stops 12. A draw bar 13 having a yoke 14 is also shown, the improved shock absorber being mounted within the yoke and coöperable with the stops.

As shown, the spring shock absorber is comprised of a series of spring plates A—A having an alternate series of spring plates B—B interposed therebetween. Two end followers C—C are also employed, said followers when employed with a draft rigging coöperating with the stops 11 and 12. As shown, each of the followers C is provided on its inner face with a series of corrugations 14—14 which corrugations are of shorter radii than the corrugations 15—15 formed in the adjacent spring plates A and in this connection, it will be understood that all of the spring plates A are of similar construction. Each of the spring plates B is also corrugated, as indicated at 16—16, the corrugations on the inner faces of the followers C and in the plates A and B being arranged in parallel, as shown in the drawing. As clearly appears from Fig. 1, the end spring plates A engage the high points of the corrugations 14 on the inner faces of the followers C and are spaced from the low or depressed portions of the corrugations of the followers C. The corrugations of the plates B, being of shorter radii and therefore of greater amplitude, will engage the plates A on one side in the low or depressed portions of the corrugations 15 thereof, and will engage the plates A on the opposite sides thereof at intermediate points of the plates A. As clearly shown in Fig. 1, the plates A are normally of greater over-all length than the normal over-all length of the plates B.

In operation, upon relative approach of the followers C, it is apparent that the plates B will tend to flatten out, and in so doing will slide and thus create friction on the plates A. The latter in turn will tend to be corrugated deeper than normal and will thereby contract in over-all length, said plates A tending to conform to the corrugations on the inner faces of the followers C. With this arrangement, it is obvious that as the plates B tend to approach a flat condition, the corrugations in the plates A are increased so that the spring plates never assume a condition where all thereof are substantially flat which is true of the usual type of corrugated spring plates and which results in a loss of capacity at the ultimate load. Furthermore, the friction created with my arrangement adds materially to the capacity of the shock absorber, and inasmuch as the engaging friction surfaces are well distributed over a large area, the wear will be materially reduced.

With the arrangement above described, the shock absorber is of high capacity; does not lose capacity as the ultimate load is applied; and for equal space occupied, is of greater capacity than the ordinary spring plate shock absorbers.

It will also be noted that on account of the corrugations being arranged in parallel, there is no tendency for the plates to slip or work sidewise and thus out of position.

I claim:

1. In a spring shock absorber, a plurality of spring plates, said plates being corrugated, the corrugations of some plates being of greater amplitude than corrugations of the other plates.

2. In a spring shock absorber, a plurality of spring plates, all of said plates being corrugated and alternate plates having the corrugations thereof of shorter radii than the others.

3. In a spring shock absorber, a plurality of spring plates, said plates being corrugated, the corrugations of some plates being of greater amplitude than corrugations of the other plates, and all of said corrugations being arranged in parallel.

4. In a spring shock absorber, the combination with a pair of followers having their inner faces corrugated, of a plurality of spring plates interposed between said followers and having also corrugations, the radii of the corrugations of some of said plates differing from the radii of others of said plates.

5. In a spring shock absorber, the combination with a pair of relatively movable followers having corrugated inner faces, of a series of corrugated spring plates interposed between said followers, the corrugations of said plates being of different radii and so arranged that, as the followers approach each other, some plates will tend to flatten out and others become more deeply corrugated.

6. In a shock absorber, the combination with two series of spring plates, both series being corrugated with the corrugations extending parallel, the corrugations of one series being deeper than the corrugations of the other series whereby upon compression, the corrugations of the spring plates having the deeper corrugations will tend to flatten out and the corrugations of the remaining spring plates tend to become deeper.

In witness that I claim the foregoing I have hereunto subscribed my name this 24th day of May, 1917.

JOHN F. O'CONNOR.